Sept. 5, 1961 P. A. GAWLIK 2,998,721
TOOL FOR DETECTING PIPE LEAKS
Filed Dec. 27, 1956 3 Sheets-Sheet 1
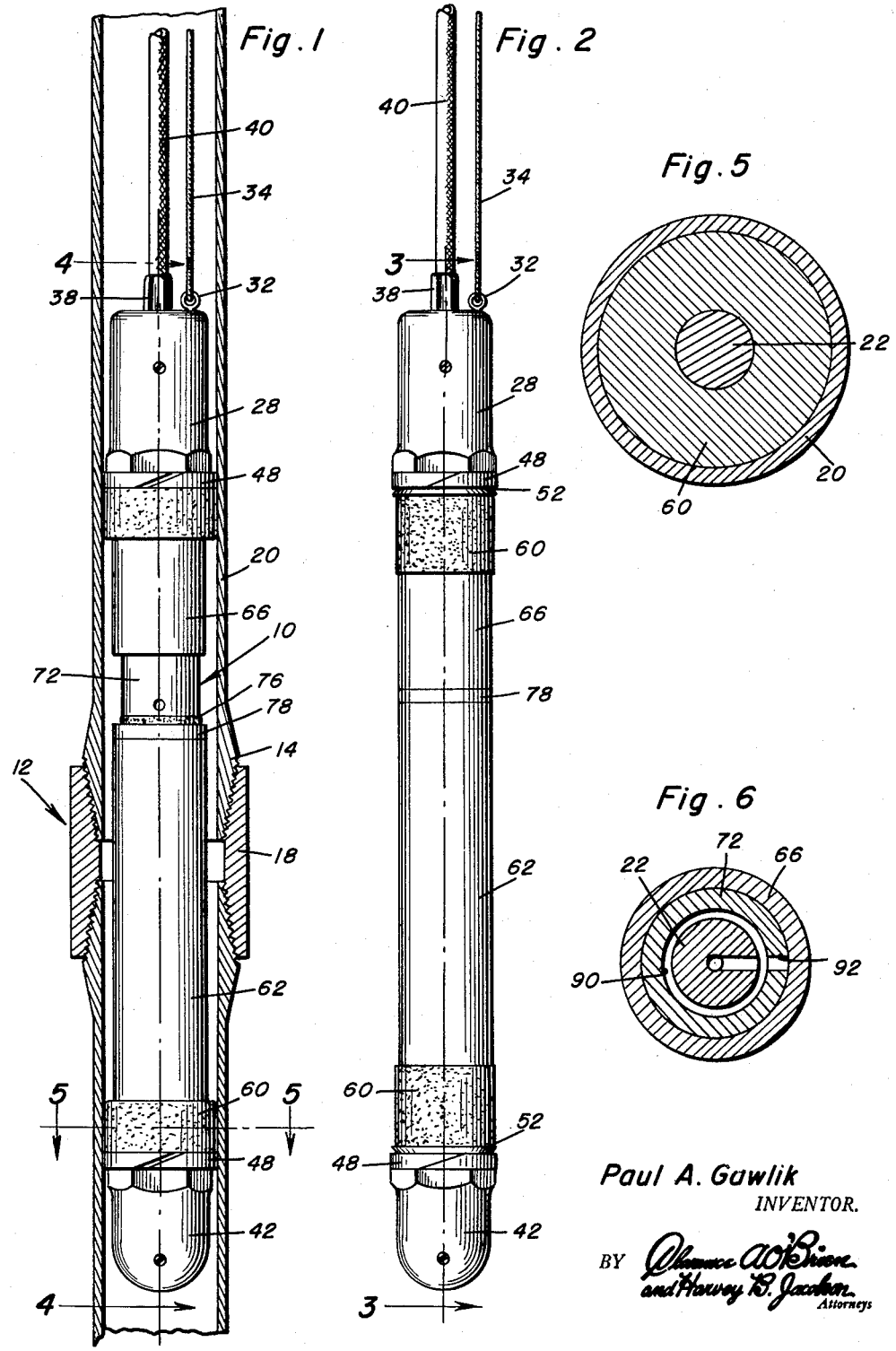
Paul A. Gawlik
INVENTOR.

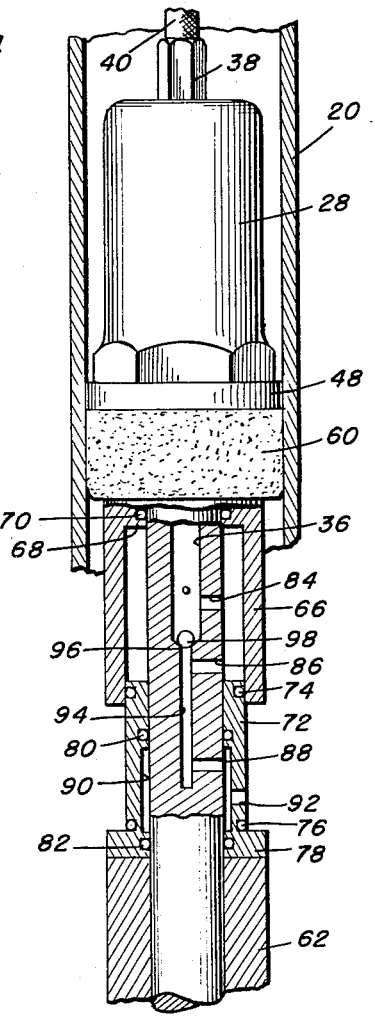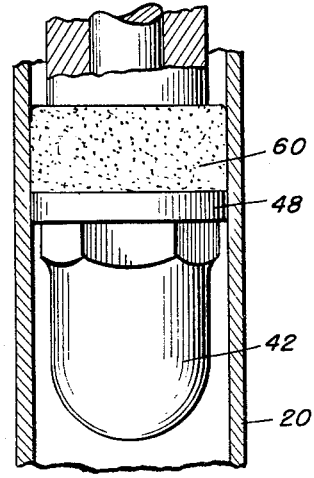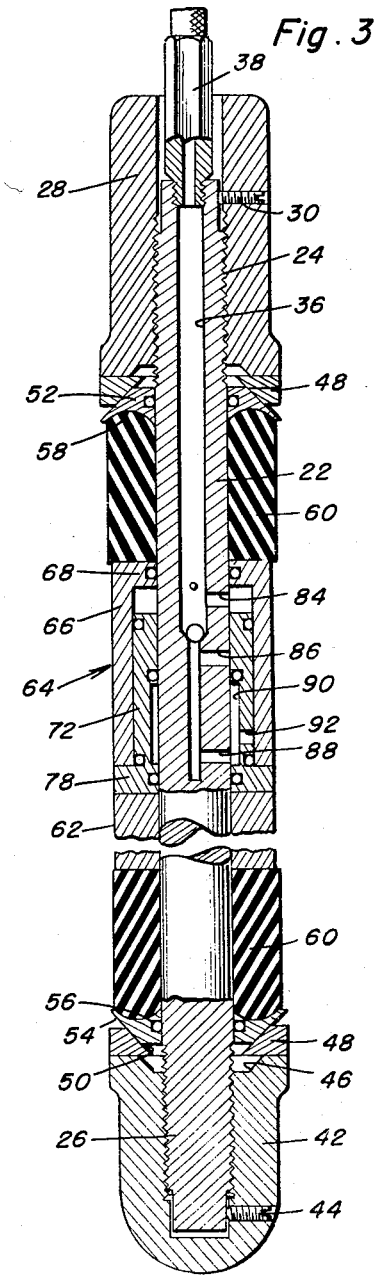

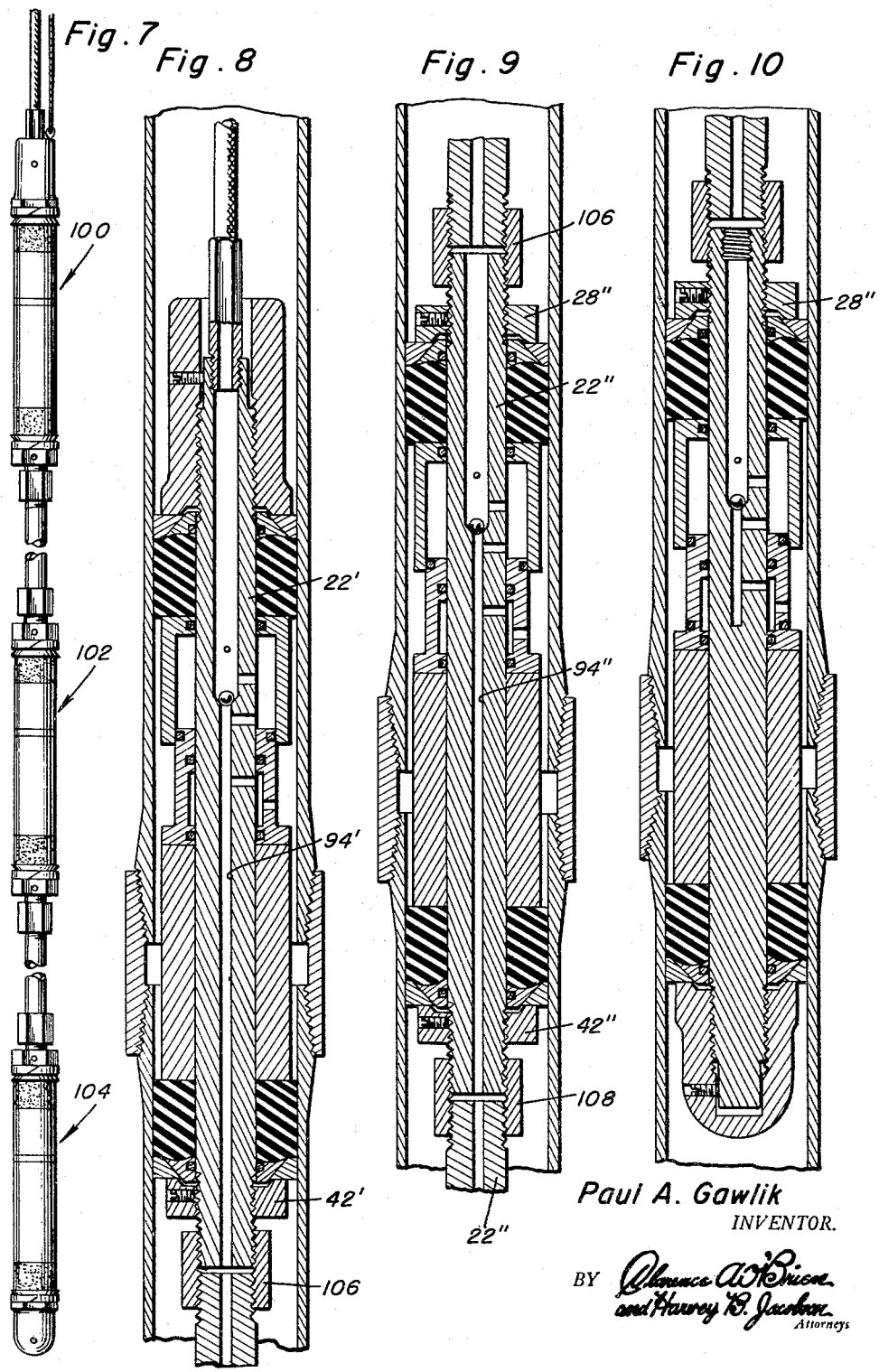

United States Patent Office 2,998,721
Patented Sept. 5, 1961

2,998,721
TOOL FOR DETECTING PIPE LEAKS
Paul A. Gawlik, Corpus Christi, Tex.
(P.O. Box 124, Falls City, Tex.)
Filed Dec. 27, 1956, Ser. No. 630,913
3 Claims. (Cl. 73—49.1)

The present invention generally relates to a device in the nature of a tool for testing for leaks in couplings between sections of oil well pipe or tubing although it may be effectively employed for testing a coupling joint in any type of pipe or tubing destined to carry high pressure fluids.

An object of the present invention is to provide a tool for detecting pipe leaks in the threaded couplings by testing such couplings at the time the pipe sections are assembled and made up at the ground level before they are let down into the oil well thus assuring that the threaded couplings do not leak under high oil or gas pressure.

Another object of the present invention is to provide a tool in accordance with the preceding object in which the couplings may be tested for any amount of pressure.

A further object of the present invention is to provide a tool for detecting pipe leaks which may also act as a device which will detect any bent places in the pipe.

Yet another object of the present invention is to provide a tool for detecting pipe leaks in which the device includes a multiple unit tester for testing a plurality of couplings simultaneously thus increasing the efficiency of the testing tool.

Yet another important object of the present invention is to provide a tool for detecting pipe leaks, especially in threaded couplings therein, which is extremely simple in construction, well adapted for its intended purposes, adapted for use with various pressures and including means for recovery of substantially all of the fluid being employed for test purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the detecting tool of the present invention with the pipe or tubing and the joint for coupling therein shown in section;

FIGURE 2 is a side elevational view of the testing tool per se;

FIGURE 3 is a longitudinal, vertical sectional view taken substantially upon a plane passing along section line 3—3 of FIGURE 2 illustrating the internal construction of the testing tool when in retracted condition;

FIGURE 4 is a longitudinal, vertical sectional view taken substantially upon a plane passing along section line 3—3 of FIGURE 1 illustrating the internal construction of the device when it is in condition for testing;

FIGURE 5 is a transverse sectional view taken substantially upon a plane passing along section line 5—5 of FIGURE 1 illustrating the details of the rubber packers;

FIGURE 6 is a transverse sectional view illustrating the piston and cylinder arrangement;

FIGURE 7 is a side elevational view illustrating the triple unit with the device being ready for insertion into a pipe line for testing three joints simultaneously;

FIGURE 8 is a detailed sectional view of the uppermost unit being shown in testing condition;

FIGURE 9 is a detailed sectional view of the central unit of the arrangement of FIGURE 7; and FIGURE 10 is a detailed sectional view showing the bottom unit of the arrangement of FIGURE 7.

Referring now specifically to the drawings, the numeral 10 generally designates the tool of the present invention for testing for leaks in a threaded pipe coupling generally designated by numeral 12 which includes a threaded collar 14 and a threaded coupling unit 18 jointing the sections 20 of pipe or tubing together.

The detecting tool 10 includes an elongated cylindrical spindle 22 having an externally threaded upper end portion 24 and an externally threaded lower end portion 26. The upper end portion 24 is in screw-threaded engagement with an enlarged nut 28 which is a back-up nut or adjustment and bail top nut which is secured in adjusted position on the upper screw-threaded portion 24 by a setscrew 30. An eye bolt 32 is threaded into the upper end of the nut 28 for receiving a raising and lowering cable 34 which may be attached at its upper end to a suitable raising and lowering device.

The spindle 22 is provided with an elongated longitudinal bore or passageway 36 in screw threaded engagement at its upper end with an adapter 38 on the lower end of the flexible hydraulic pressure hose 40 which may be communicated with a hydraulic pump (not shown) for supplying pressurized liquid such as water to the bore 36. The pump may be provided with a by-pass valve (not shown) which may be adjustable for adjusting and determining the pressure of the testing liquid being discharged to the longitudinal bore 36.

The lower threaded portion 26 of the spindle 22 is provided with an adjustment and back-up nut 42 secured in adjusted position by the setscrew 44. The inwardly facing surfaces of the nuts 28 and 42 are each provided with a recessed or counter-sunk area 46.

A split spring steel ring 48 encircles the spindle 22 with the spring ring 48 being disposed in contacting engagement with the facing ends of the nuts 28 and 42. Each of the spring rings 48 is provided with an outwardly tapering inner wall surface 50 which faces towards the center of the spindle 22 with the outward taper being generally 45°.

For each of the spring rings 48, there is provided a tapered wedge 52 having an outer surface 54 oppositely tapered to the surface 50 of the spring rings 48 whereby the spring rings 48 will be expanded and contracted by longitudinal movement of the wedges 52 on the spindle 22. Each of the wedges 52 is provided with an O-ring seal 56 in encircling and contacting engagement with the spindle 22 for sealing the wedges 52 to the spindles 22 during the longitudinal sliding movement thereon. The wedges 52 are each provided with an annular concave surface 58 facing inwardly for receiving the annular convex end of a rubber packer 60 which is generally cylindrical in construction. The construction of the spring ring 48, wedge 52 and rubber packer 60 is identical at each end of the spindle 22 with the nuts 28 and 42 respectively cooperating with the spring rings in an identical manner.

Disposed against the inner end of the lower packer 60 is an elongated tubular spacer 62 which is freely slidable on the spindle 22.

Disposed between the lower end or inner end of the upper packer 60 and the upper end of the spacer 62 is an expandible piston and cylinder arrangement generally designated by numeral 64 for expanding longitudinally on the spindle 22 from a collapsed to an expanded position.

The piston and cylinder arrangement 64 includes a cylinder 66 arranged in concentrically spaced relation to the spindle 22 and the cylinder 66 includes an inwardly extending peripheral flange 68 at its upper end having an O-ring seal 70 in sliding and sealing engagement with the spindle 22. A cylindrical piston 72 is slidably disposed on the spindle 22 and is telescopically received within the cylinder 66. An O-ring seal 74 is provided on the outer upper end of the piston 72 for sliding sealing engagement with the inner surface of the cylinder 66 and an O-ring seal 76 is provided adjacent the lower end of the piston 76 for sealing engagement with the lower end of the cylinder 66 when the piston 72 is fully received within the cylinder 66. The piston 72 is provided with a bottom plate 78 which is annular in configuration and generally the same size as the cylinder 66 thus forming a limit for the inward movement of the piston 72 into the cylinder 66 inasmuch as the upper surface of the plate 78 will contact the lower edge of the cylinder 66. Generally centrally of the cylinder 72 and slightly towards the upper end thereof an O-ring seal 80 is provided on the inner surface thereof for sliding and sealing engagement with the spindle 22. Also, the plate 78 is provided with an O-ring seal 82 for sealing engagement with the spindle 22 thus providing both the inner and outer surfaces of the piston 72 with two spaced O-ring seals. It is pointed out that all of the previously mentioned O-ring seals are received in proper depth grooves for sliding and sealing engagement with the respective surfaces.

Disposed in the spindle 22 are three vertically spaced radial ports designated by numerals 84, 86 and 88. Also, the piston 72 is provided with a cylindrical annular recess 90 in the inner surface thereof for providing an annular space between the spindle 22 and the piston 72. The piston 72 is also provided with a radial port 92 communicating the recess 90 with the outer surface of the piston 72.

The bore 36 into the spindle 22 has a reduced cross sectional area 94 adjacent its bottom with the juncture between the cross sectional area of one dimension and the smaller dimension forming a valve seat 96 for receiving the ball check valve 98. The seat 96 and the ball check valve 98 is generally one-half way between port 84 and port 86.

In operation, the operator will apply water pressure or any other hydraulic pressure by any suitable control valve and also relieve the same by any suitable relief valve and a pressure gauge may be provided for determining the pressure drop after the tool has been positioned and expanded as set forth hereinafter. As the water pressure is applied through the hose line into the passageway 36 in the spindle 22, the water will enter the area between the inner end of piston 72 and the inner end of cylinder 66 by passage through the port 84. This pressure will force the top of the cylinder or flange 68 against the upper packer 60 and will cause piston 72 along with plate 78 and spacer 62 to move longitudinally for expanding the lower packer 60.

As the water pressure expands the piston and cylinder arrangement, the rubber packer 60 will expand into sealing engagement with the pipe sections 20 and also the split rings 48 will be expanded against the inner wall of the pipe sections 20. As the piston 72 moves longitudinally to its lowermost position, the port 86 will be communicated with the area between the spindle 22 and the cylinder 66 whereby the water pressure may pass down through the reduced cross sectional bore 94 below the check valve 98 and thus outwardly through port 88 into the concentric area 90 and out through the port 92 in the piston 72. The pressure then remains between the pipe coupling and pipe sections and the tool and a test may be made for leaks by determining the pressure drop in the system by observing a suitable pressure gauge or by any other means. The check valve 98 seals off ports 86 and 88 from port 84 during the expansion and the check valve also acts as a relief valve when pressure is released. Instead of the pressure water going back out the same way it came into the area between the pipe and the tool, it takes a short cut going in port 92, recess 90, port 88 and upwardly through passageways 94 and 36 and back out through the hose 40. O-ring 76 will prevent any water from dripping downwardly from the tool thus eliminating the possibility of water dripping on men working below the tool while the tool is hanging above them, such as would occur when normally assembling pipe sections. This tool also has no spring loaded pressure valves or release valves and the adjustment nuts are initially adjusted for placing port 86 in proper relation to the piston and cylinder by moving the spindle 22 up or down in relation to the piston and cylinders. Also, the rubber packers must necessarily be expanded and seal the pipe before water enters into the area between the pipe and the tool when the port 86 is properly adjusted so that it will not be uncovered by movement of the piston 72 until the packers 60 are completely expanded into sealing contact. Port 84 is slightly larger than port 86 to assure that a constant pressure will be exerted against the packer 60 due to the restriction in flow thus assuring a constant seal or expansion of the packers 60 and the spring rings 48.

Referring now specifically to FIGURES 7–10, numeral 100 designates the upper detecting tool or unit, numeral 102, the central detecting unit and numeral 104 the lowermost detecting unit of a triple detecting unit tool of the type which may be employed for simultaneously testing three couplings in an assembled pipe. These units are substantially the same as the single unit specifically illustrated and described in connection with FIGURES 1–6 of the drawings and the same reference numerals will be employed with the reference numerals being primed.

FIGURE 8 illustrates the upper unit 100 with the spindle 22' having an identical construction with the exception that the bore 94' extends completely through the length of the spindle 22 and communicates with a spindle 22" employed in FIGURE 9 which illustrates the second unit 102. The lower nut 42' is of smaller dimension than the nut 42 in FIGURES 1–6 but operates in an identical manner. The spindles 22' and 22" are interconnected by a screw-threaded coupling member 106.

FIGURE 9 illustrates the top nut 28" as being similar in construction to the bottom nut 42' in FIGURE 8 and operates in the identical manner. In this unit, the bore 94" extends throughout the length of the spindle 22" and the bottom nut 42" is substantially the same as 42' in FIGURE 8. The lower end of the spindle 22" is connected to the top end of the spindle 22''' of the lowermost unit 104 by a coupling element 108.

The unit 104 is identical to the unit illustrated in FIGURES 1–4 with the exception of the upper adjustment nut 28'''. The remainder of the structure in FIGURE 10 is identical in configuration and orientation to that construction illustrated in FIGURES 1–6. The construction of FIGURES 8 and 9 also differs in that the O-ring seal adjacent the bottom outer edge of the piston is not employed since the lowermost unit 104 will prevent dripping of water onto men working below.

The arrangement illustrated in FIGURES 7–10 employes the identical principle as employed in the device shown in FIGURES 1–4 except that more than one unit is used at one time and more than one pipe connection can be tested at one time.

When pressure fluid or water enters into the uppermost unit 100, it first expands its cylinder and piston arrangement and causes the rubber packers to seal off the first upper pipe connection and then filling the space between the tool unit 100 and the pipe wall at the connection at a pressure required to compress the rubber packer seals. At the same time the fluid comes down into the tool unit 102 through the bore 94' and expands and compresses the rubber packer seals in the second unit. The area between the second unit and the wall of the pipe is also filled and at the same time pressure comes down into the third unit 104 through the bore 94" for expanding the piston and cylinder arrangement thus expanding the packers for sealing the third unit 104 and simultaneously filling the area between the lowermost tool and the pipe wall. Then the fluid may be pressured to the desired pressure for testing. The units are relieved of their pressure in the same manner as the unit of FIGURES 1–6 and the three unit construction employes a minimum of water or pressure fluid for conducting the tests and an elongated hollow extension bar identical in size to the spindle may be provided for orientating the units, 100, 102 and 104 in any desired vertically spaced relation for aligning the units with the pipe couplings to be tested.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for detecting leaks in pipes comprising an elongated body adapted to be inserted into a pipe, end members mounted on said body, a pair of longitudinally movable members mounted on said body, an expansible packer mounted between the outer end of each movable member and the adjacent end member for expansion into contact with the pipe at longitudinally spaced points when the movable members are moved longitudinally outwardly thereby sealing a section of the pipe, a fluid pressure line connected to said body, said movable members being actuated by fluid pressure and forming valve means for admitting fluid pressure between the expanded packers responsive to longitudinal outward movement of the movable members for pressurizing the section of pipe for detecting leaks by determining any pressure drop, one of said movable members being provided with a cylindrical portion concentrically spaced from said body, the other movable member having a cylindrical projection coaxial with the body and slidably and telescopically received in said portion, means communicating the fluid pressure line with the area between the longitudinally movable members, said last named means including a longitudinal bore extending into said body, a radial port communicating the bore with the interior of the cylindrical portion, said radial port being above the inner end of the cylindrical projection which forms a piston when in its innermost position thus urging the piston longitudinally outwardly of the cylindrical portion, said valve means being responsive to outward longitudinal movement of the piston for admitting pressure into the area between the detecting device and the inner surface of the pipe, said valve means including an extension of the longitudinal bore in said body in sealed relation to the first mentioned longitudinal passage, a first radial bore communicating the extension of the bore with the area between the body and the cylindrical portion when the piston is moved outwardly on the body, a second radial bore communicating the extension of the bore with the outer surface of the body, and a radial bore in said piston in fluid communication with the second radial bore leading from the extension of the bore thus discharging fluid pressure into engagement with the inner surface of the pipe coupling after the piston moves longitudinally outwardly to uncover the first radial bore thereby providing fluid communication between the longitudinal bore and extension by communicating the radial port with the first radial bore.

2. The structure as defined in claim 1 wherein said elongated body is in the form of a spindle having externally threaded end portions, and a nut threaded onto each externally threaded end portion of the spindle and forming means for retaining the end members in adjustable position on the spindles.

3. A device for detecting leaks in pipes comprising an elongated body adapted to be inserted into the pipe, end members stationarily mounted on said body, a pair of longitudinally movable members mounted on said body intermediate said end members, an expandible packer mounted between each movable member and the adjacent end member for radial expansion into contact with the pipe at longitudinally spaced points when the movable members are moved longitudinally outwardly thereby sealing off a section of the pipe, a fluid pressure line connected to said body, said movable members being actuated by fluid pressure and forming valve means for admitting fluid pressure between the expanded packers in response to longitudinal outward movement of the movable members for pressurizing the section of pipe for detecting leaks by measuring pressure drops, said movable members having a telescopically engaged axial recess and an axial piston received therein, the inner ends of the recess and piston being normally spaced and communicated with the fluid pressure line whereby entrance of fluid pressure into the body will initially force the movable members apart thereby expanding the packers, said body including a longitudinal passageway communicated with the interior of the axial recess adjacent the outer end thereof when in the expanded position of said members, whereby pressure disposed between the piston and recess will enter the longitudinal passage when the piston moves outwardly, said piston including a radial opening communicating with the longitudinal passage in the body and open to the interior surface of the pipe when the piston is moved outwardly in relation to the recess thereby communicating fluid pressure with the interior of the pipe only when the piston has been forced outwardly of the axial recess to substantially its full extent.

References Cited in the file of this patent

UNITED STATES PATENTS

| | | |
|---|---|---|
| 1,802,525 | Newlin | Apr. 28, 1931 |
| 1,808,958 | Lane et al. | June 9, 1931 |
| 2,715,444 | Fewel | Aug. 16, 1955 |
| 2,731,827 | Loomis | Jan. 24, 1956 |
| 2,841,007 | Loomis | July 1, 1958 |